United States Patent
Sun et al.

(10) Patent No.: US 10,637,672 B2
(45) Date of Patent: Apr. 28, 2020

(54) APPARATUS AND METHODS OF POWER OVER ETHERNET

(71) Applicant: ZHEJIANG UNIVIEW TECHNOLOGIES CO., LTD, Hangzhou (CN)

(72) Inventors: Lingliang Sun, Hangzhou (CN); Binbin Wu, Hangzhou (CN)

(73) Assignee: Zhejiang Uniview Technologies Co., Ltd, Hangzhou (CN)

(*) Notice: Subject to any disclaimer, the term of this patent is extended or adjusted under 35 U.S.C. 154(b) by 645 days.

(21) Appl. No.: 15/332,963

(22) Filed: Oct. 24, 2016

(65) Prior Publication Data
US 2017/0118032 A1  Apr. 27, 2017

(30) Foreign Application Priority Data
Oct. 22, 2015 (CN) .................. 2015 2 0820088 U (51) Int. Cl.
*H04L 12/10* (2006.01)
*H04L 12/26* (2006.01)

(52) U.S. Cl.
CPC .............. *H04L 12/10* (2013.01); *H04L 43/10* (2013.01)

(58) Field of Classification Search
CPC ................. H04L 12/26; H04L 12/10
USPC ......................................................... 307/104
See application file for complete search history.

(56) References Cited

U.S. PATENT DOCUMENTS

| 2008/0098240 A1* | 4/2008 | Hussain | H04L 12/66 713/300 |
| 2015/0244536 A1* | 8/2015 | Ma | H04L 12/40045 713/300 |

\* cited by examiner

*Primary Examiner* — Daniel Kessie
*Assistant Examiner* — Swarna N Chowdhuri
(74) *Attorney, Agent, or Firm* — McCoy Russell LLP (57) ABSTRACT

A power over Ethernet apparatus is provided. The power over Ethernet apparatus includes a power sourcing equipment (PSE) controller, a main chip and a redundant controller. The PSE controller is for power allocation among ports of the power over Ethernet apparatus. The main chip is coupled to the PSE controller through a first branch and for controlling the PSE controller. The redundant controller is coupled with the main chip, and coupled to the PSE controller through a second branch to control the PSE controller when the main chip stops sending a heart-beat signal. Methods of power over Ethernet are also provided.

10 Claims, 6 Drawing Sheets

FIG. 8

APPARATUS AND METHODS OF POWER OVER ETHERNET

CROSS-REFERENCE TO RELATED APPLICATIONS

The present application claims priority to Chinese Patent Application No. 201520820088.1, filed on Oct. 22, 2015, the entire contents of which are hereby incorporated by reference for all purposes.

TECHNICAL FIELD

The present disclosure relates to a power over Ethernet apparatus and methods of power over Ethernet.

BACKGROUND

Power Over Ethernet (abbreviated as POE) refers to a technique, under the configuration of Ethernet Cat.5 wiring basis, transporting data signals for terminal devices based upon Internet Protocol (IP), such as IP telephones, wireless local area network access points (AP), network video recorders etc., and also supplying direct current (DC) power to such terminal devices. A POE apparatus may include a power sourcing equipment (PSE) and a powered device (PD). Utilizing the POE technique, a wall power supply is not needed to be provided to supply power to the terminal device connected with POE, so that the cost of power wiring of the power supply may be efficiently saved.

SUMMARY

In accordance with one aspect of the present disclosure, a power over Ethernet apparatus is provided. The power over Ethernet apparatus includes a power sourcing equipment (PSE) controller, a main chip and a redundant controller. The PSE controller is for power allocation among ports of the power over Ethernet apparatus. The main chip is coupled to the PSE controller through a first branch and for controlling the PSE controller. The redundant controller is coupled with the main chip, and coupled to the PSE controller through a second branch to control the PSE controller when the main chip stops sending a heart-beat signal.

In accordance with another aspect of the present disclosure, a method of power over Ethernet is provided. The method includes controlling, via the main chip, the PSE controller through the first branch, and sending the heart-beat signal to the redundant controller; and controlling, via the redundant controller, the PSE controller through the second branch when the main chip stops sending the heart-beat signal.

In accordance with another aspect of the present disclosure, a method of power over Ethernet is provided. The method includes sending, via the redundant controller, a first control signal to the control terminal of the branch switching module when the main chip stops sending the heart-beat signal; switching on, via the branch switching module, the second branch in response to the first control signal; and controlling, via the redundant controller, the PSE controller through the second branch when the second branch is on.

DETAILED DESCRIPTION

One embodiment of the present disclosure takes a NVR (Network Video Recorder) as a POE apparatus, and an IPC (IP Camera) as a powered device powered by POE.

Figure 1:
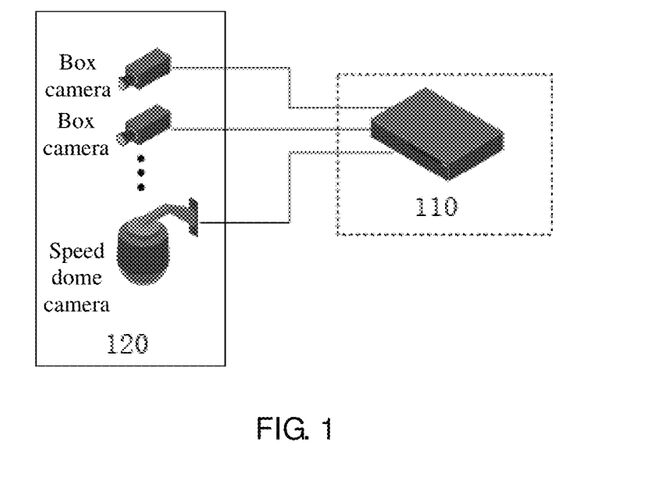
FIG. 1 is a schematic view of a monitor system network supporting POE in accordance with an embodiment.

In FIG. 1, after integration of a POE port on the NVR 110, the IPC 120 may be directly connected with the POE port of the NVR 110 to be powered by the NVR 110 so as to effectively simplify a monitor system network.

Figure 2:
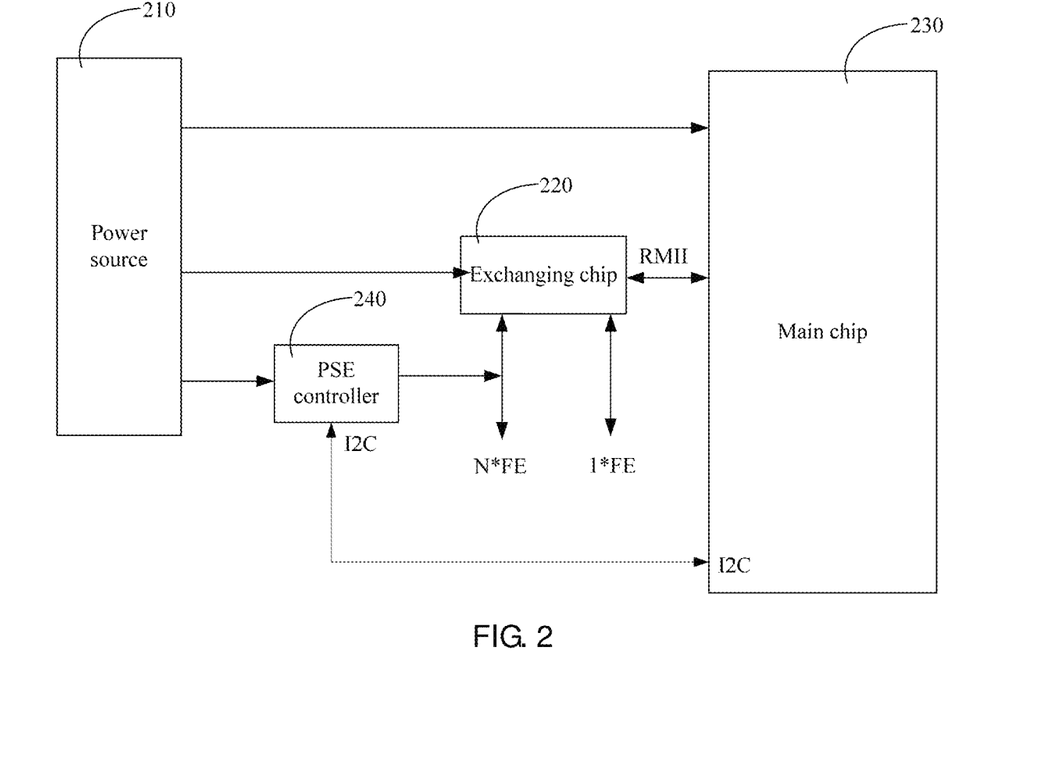
FIG. 2 is a structural schematic view of an online hard disk camera supporting POE in accordance with an embodiment.

FIG. 2 is a hardware structural schematic view of the NVR supporting the POE. A power source 210 supplies power to the POE ports 1*FE~N*FE through an exchanging chip 220. And in FIG. 2, a main chip 230 controls a PSE controller 240 for power allocation among the POE ports to be able to supply power to the IPC powered by the POE.

When failure, upgrading, restarting and/or soft-off of the main chip 230 of the NVR occurs, the main chip 230 may operate abnormally, so that the NVR cannot supply power to the IPC through the POE. The power may be supplied by dual power supplies, i.e. the powered device may be powered through Ethernet and connected with another external power supply, such as a wall power supply, so that the external power supply may supply power when a problem of powering through Ethernet. However, the method cannot achieve the purpose of simplifying the system through supplying power through Ethernet.

The NVR supplying power to the POE may relate to apparatus power supplying parameters, port power supplying parameters and a power supplying strategy. The apparatus power supplying parameters include: a gross supplying power, whose unit is W, refers to a power capability of the POE apparatus, which is unchangeable typically; an actual used gross power, whose unit is W, refers to a sum of power in actual use of all ports.

The port power supplying parameters include: POE port numbers referring to the sequence numbers of the POE ports; an actual used power of the POE ports referring to power output in actual from the POE ports, whose unit is W; power supplying states at least including a normal power supplying state, not-power supplying state and not-connected with powered device state.

When the NVR supplying power to the POE, the gross supplying power may be lower than the actual used gross power from all POE ports. In this condition, power for one or more POE ports may be stopped according to the power supplying strategy to ensure the power is supplied to the more important powered device(s). For example, when the NVR supplies power to the POE, the port(s) in the small port number(s) may be preferably selected to be powered. As such, when the gross supplying power is lower than the actual used gross power, the port(s) in the larger port number(s) may be stopped being powered so as to ensure the power is supplied to the powered device(s) connected to the port(s) in the smaller port number(s).

Figure 5:
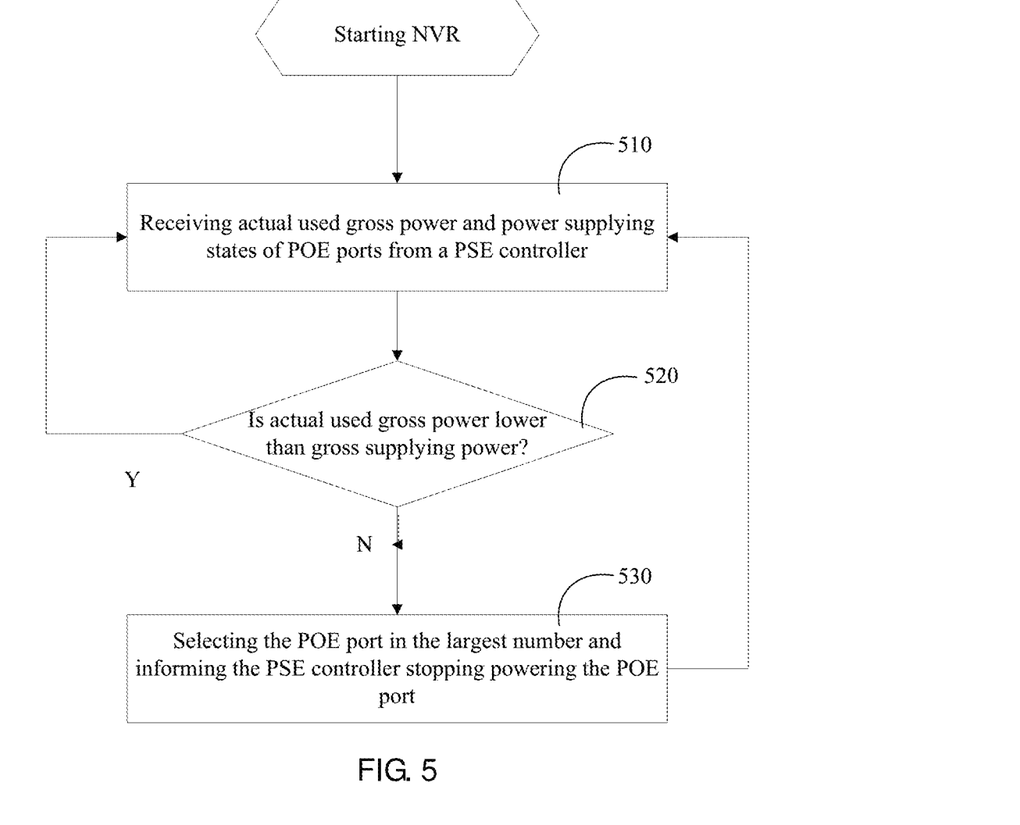
FIG. 5 is a schematic flow diagram of a POE power supplying control method in accordance with an embodiment.

A process of POE power control of the main chip 230 is shown in FIG. 5. At step 510, a POE power control module of the main chip 230 periodically receives the actual used gross power and the power supplying states of the POE ports from the PSE controller 240 after the NVR is started. At step 520, determining whether the actual used gross power is lower than the gross supplying power. If the actual used gross power is not lower than the gross supplying power, i.e. the actual used gross power is higher than or equal to the gross supplying power, the POE power control module of the main chip 230 selects the POE port in the largest port number from the powered POE ports and informs the PSE controller 240 to stop powering the POE port in the largest port number, in step 530.

After stopping powering one of the POE port each time, the process may return back to the step 510 to iteratively compare the actual used gross power and the gross supplying power. And, if the actual used gross power is higher than or equal to the gross supplying power at step 520 again, the POE port with the largest port number in the remaining powered POE ports is stopped being powered at step 530, until the actual used gross power is lower than the gross supplying power.

Figure 3:
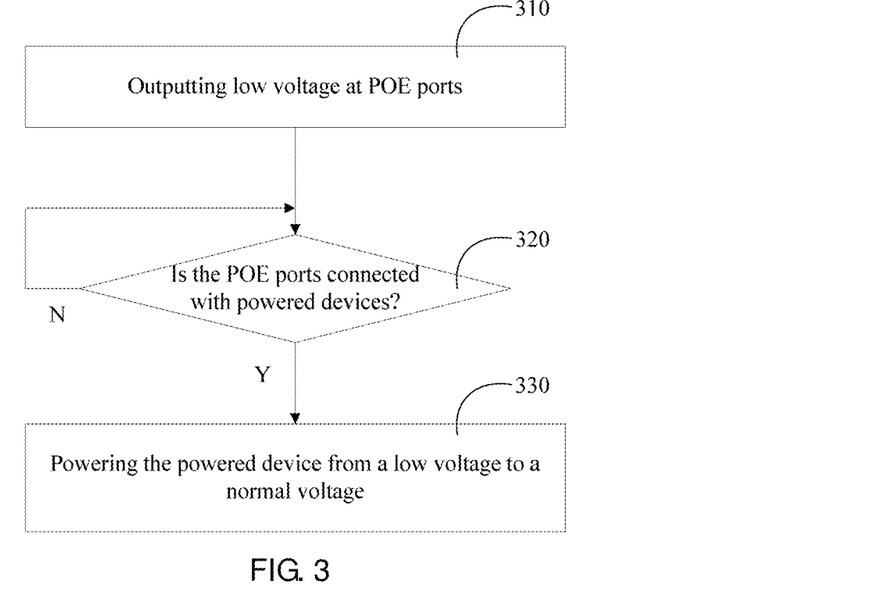
FIG. 3 is a schematic flow diagram of a POE power supplying process in accordance with an embodiment.

A POE power supplying process controlled by the main chip 230 is shown in FIG. 3. At step 310, the PSE controller 240 controls the POE ports to output a low voltage, such as 6-10V. Then, at step 320, the PSE controller 240 determines whether the POE ports are connected with the powered devices until it detects that the POE ports are connected with the powered devices such as a device supporting IEEE 802.3af/at. After the PSE controller 240 detects the powered devices, at step 330, the powered devices are powered from a low voltage such as 6-10V to a normal voltage of a DC power source such as 44-57V during initiation time (typically lower than 15 µs).

Figure 4:
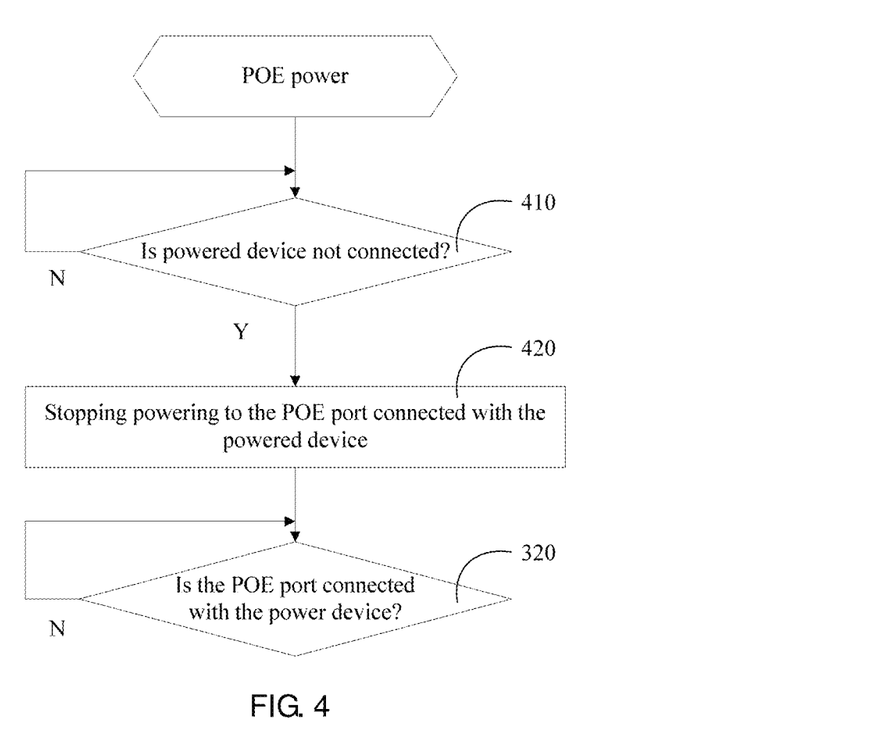
FIG. 4 is a schematic flow diagram of a POE power-off process in accordance with an embodiment.

A power-off process of the NVR as the POE apparatus is shown in FIG. 4. After being powered through the power supplying process in FIG. 3, at step 410, the PSE controller 240 determines whether the connection of the powered device with the NVR is switched off. If the connection is switched off, the PSE controller 240 rapidly stops supplying power to the POE ports connected with the powered device, i.e. stepping into step 420. Then, the PSE controller 240 may step into the step 320 in FIG. 3, i.e. iteratively checking the POE ports to check whether the POE ports are connected with the powered device.

In accordance with the illustrative example, a POE apparatus is provided. The POE apparatus utilizes a simple redundant design to maintain the Ethernet supplying power normally during the abnormal operation of the main chip.

Figure 6:
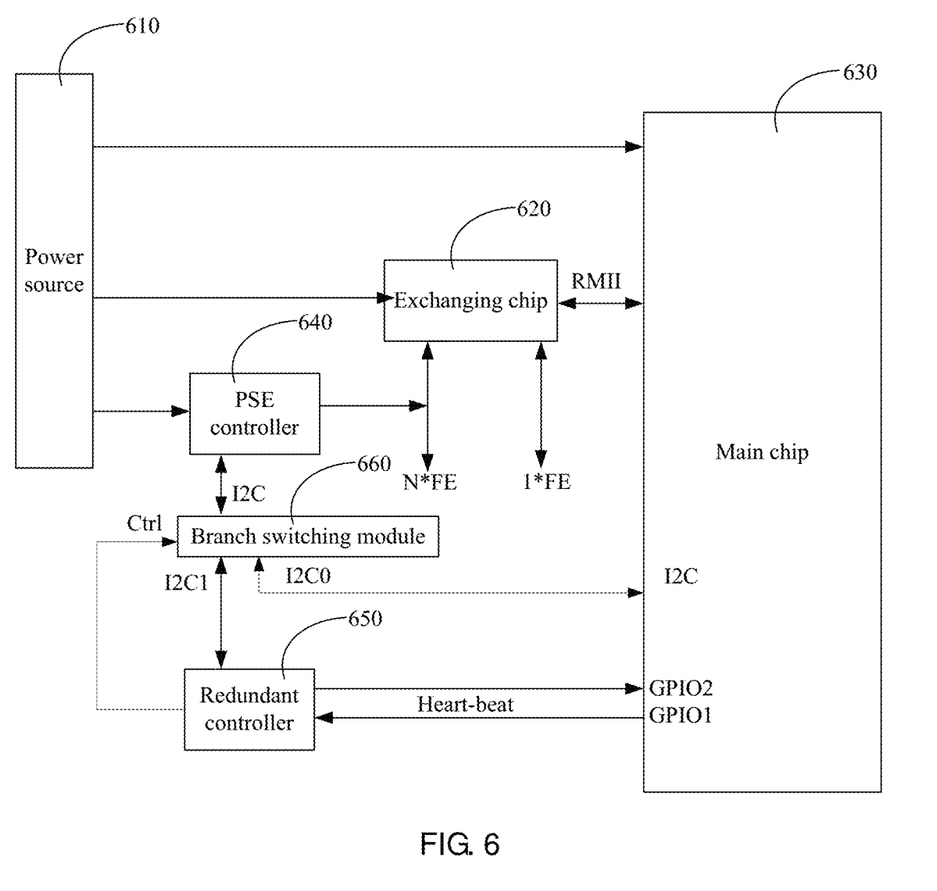
FIG. 6 is a structural schematic view of a POE apparatus in accordance with an embodiment.

In FIG. 6, the POE apparatus includes a power source 610, an exchanging chip 620, a main chip 630, a PSE controller 640, a redundant controller 650 and a branch switching module 660. The power source 610 supplies power to the POE ports 1*FE~N*FE through the exchanging chip 620. The PSE controller 640 is for power allocation among the POE ports to supply power to the powered device such as IPC capable of being powered by the POE.

Compared with the POE apparatus in FIG. 2, the POE apparatus in FIG. 6 includes the redundant controller 650 and the branch switching module 660 to achieve hardware redundant. The redundant controller 650 may include a microcontroller in an embodiment. In other embodiments, the redundant controller 650 may include a similar microprocessor or a CPLD (Complex Programmable logic Device). Since adding a connection between the redundant controller 650 and the PSE controller 640, the branch switching module 660 may control two connections referred to as switching between two branches hereinafter. In an embodiment, the branch switching module 660 may include an IIC (Inter-Integrated Circuit) exchanging chip such as I2C_Switch.

In FIG. 6, the branch switching module 660 includes the first input terminal I2C0 connected with the main chip 630, the second input terminal I2C1 connected with the redundant controller 650, the output terminal I2C connected with the PSE controller 640 and the control terminal Ctrl connected with the redundant controller 650. The redundant controller 650 outputs a control signal from the control terminal Ctrl to achieve switching between two branches.

For example, the branch switching module 660 may receive the control signal in a low level to make the branch switching module 660 to maintain the current connected branch when the redundant controller 650 receives a heart-beat signal from the main chip 630. In this case, the first branch from the main chip 630 to the PSE controller 650 is switched on, and the second branch from the redundant controller 650 to the PSE controller 640 is switched off.

Then, if the main chip 630 stops sending the heart-beat signal, the redundant controller 650 may output the control signal in a high level to the branch switching module 660 to command the branch switching module 660 to switch the branches. In this case, the second branch from the redundant controller 650 to the PSE controller 640 is switched on, the first branch from the main chip 630 to the PSE controller 640 is switched off.

The redundant controller 650 outputs the control signal to the control terminal Ctrl of the branch switching module 660 in the low level, after the branch switching of the branch switching module 660. Then, if the redundant controller 650 receives the heart-beat signal from the main chip 630 again, the control signal in the high level is sent to the branch switching module 660 again to command the branch switching module 660 to switch the branches.

Also for example, if the redundant controller 650 receives the heart-beat signal from the main chip 630, the level of the control signal sent to the control terminal Ctrl of the branch switching module 660 is maintained constant to command the branch switching module 660 maintaining the current connection state of the branches. Maintaining the level of the control signal constant includes maintaining the control signal in the high level or the low level. In this case, the first branch from the main chip 630 to the PSE controller 640 is switched on, the second branch from the redundant controller 650 to the PSE controller 640 is switched off in an embodiment.

Then, if the main chip 630 stops sending the heart-beat signal, the redundant controller 650 changes the level of the control signal to command the branch switching module 660 to switch the branches. Changing the level of the control signal may include changing the control signal from the high level to the low level or from the low level to the high level. Through the branch switching, the second branch from the redundant controller 650 to the PSE controller 640 is switched on, the first branch from the main chip 630 to the PSE controller 640 is switched off in an embodiment.

Then, if the redundant controller 650 receives the heart-beat signal from the main chip 630 again, the level of the control signal is changed again to command the branch switching module 660 to switch the branches.

A method of the redundant controller 650 controlling the PSE controller 640 may be the same as a control method of the main chip 630, and the redundant controller 650 and the main chip 630 may be connected and send the heart-beat signal in a bidirectional communication.

The main chip 630 sends the actual used gross power and the power supplying states from the PSE controller 640 to the redundant controller 650. For example, the redundant controller 650 may send an inquiry signal to the main chip 630 and maintain a heart-beat path for the main chip 630 regularly sending the heart-beat signal to the redundant controller 650. Thus, the main chip 630 may send the actual used gross power and the power supplying states received from the PSE controller 640 to the redundant controller 650 through the heart-beat path.

When the POE apparatus is initiated, the main chip 630 controls the PSE controller 640 by default, and the redundant controller 650 may send regularly inquiries to the main chip 630 through an inquiry path in the second branch. In response to this, the main chip 630 may regularly send the heart-beat signal to the redundant controller 650, for example, the heart-beat signal may be sent every three seconds. In this case, the redundant controller 650 may not participate in the power supplying control of the PSE controller 640.

If the heart-beat signal are stopped being sent to the redundant controller 650 for such reasons like failure, upgrading, restarting or soft-off of the main chip 630, the redundant controller 650 controls the PSE controller 640 to make sure the power is supplied to the powered device continuously. The control of the PSE controller 640 by the redundant controller 650 may be ceased when the heart-beat signal between the redundant controller 650 and the main chip 630 is resumed.

The reliability of POE in the present disclosure is effectively improved through utilizing microcontroller etc. to achieve a redundant control path. The power is supplied to the powered device continuously even if the abnormal operation like damage, system updating, restart or soft-off etc. of the main chip.

The present disclosure also provides a method of POE based on the POE apparatus of the above embodiments.

Figure 7:
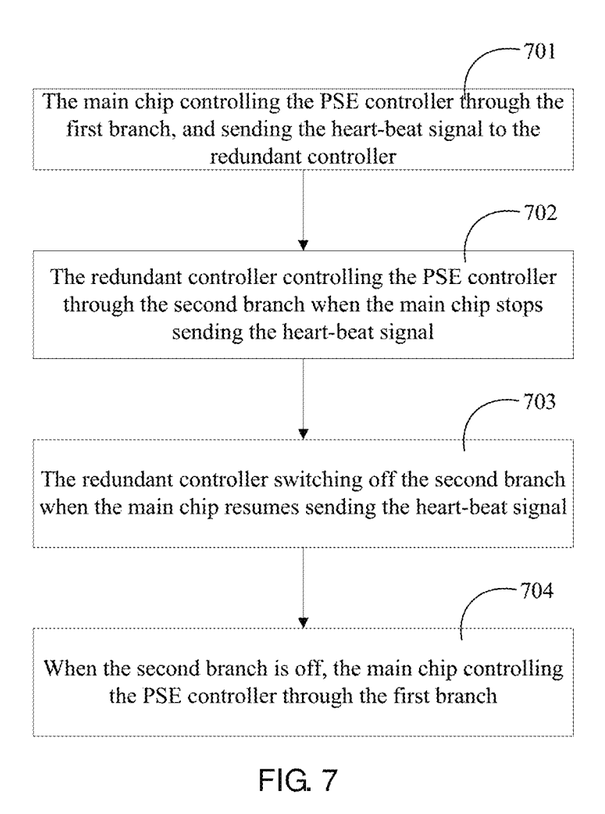
FIG. 7 is a schematic flow diagram of a POE power supplying method in accordance with an embodiment.

FIG. 7 illustrates a method of POE in accordance with an embodiment, which is suited for a POE apparatus including a PSE controller, a main chip and a redundant controller.

At step 701, the main chip controls the PSE controller through the first branch, and sends the heart-beat signal to the redundant controller.

At step 702, the redundant controller controls the PSE controller through the second branch when the main chip stops sending the heart-beat signal.

At step 703, the redundant controller switches off the second branch when the main chip resumes sending the heart-beat signal.

At step 704, when the second branch is off, the main chip controls the PSE controller through the first branch.

Figure 8:
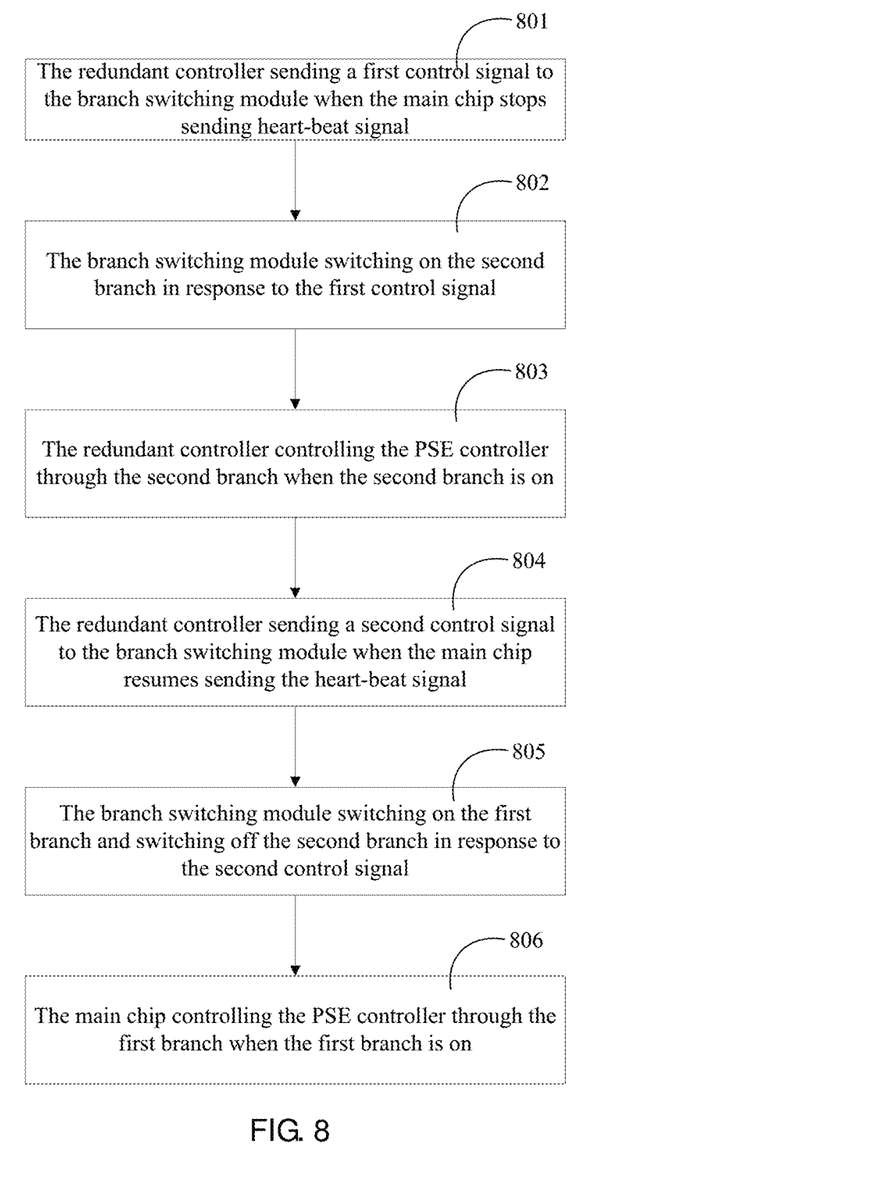
FIG. 8 is a schematic flow diagram of the POE power supplying method in accordance with another embodiment.

FIG. 8 illustrates a method of POE in accordance with an embodiment which is suited for a POE apparatus including a PSE controller, a main chip, a redundant controller and a branch switching module.

At step 801, the redundant controller sends a first control signal to the branch switching module when the main chip stops sending heart-beat signal.

At step 802, the branch switching module switches on the second branch in response to the first control signal.

At step 803, the redundant controller controls the PSE controller through the second branch when the second branch is on.

At step 804, the redundant controller sends a second control signal to the branch switching module when the main chip resumes sending the heart-beat signal.

At step 805, the branch switching module switches on the first branch and switches off the second branch in response to the second control signal.

At step 806, the main chip controls the PSE controller through the first branch when the first branch is on.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A power over Ethernet apparatus, comprising:
   a power sourcing equipment (PSE) controller for power allocation among ports of the power over Ethernet apparatus;
   a main chip coupled to the PSE controller through a first branch and for controlling the PSE controller;
   a redundant controller coupled with the main chip, and coupled to the PSE controller through a second branch to control the PSE controller when the main chip stops sending a heart-beat signal, wherein the main chip stopping sending the heart-beat signal indicates that the main chip no longer controls the PSE controller; and
   a branch exchanging chip coupled with the redundant controller, and configured for switching between the first branch and the second branch according to a control signal from the redundant controller.

2. The power over Ethernet apparatus of claim 1, wherein the redundant controller comprises a micro-processor.

3. The power over Ethernet apparatus of claim 1, wherein the redundant controller comprises a complex programmable logic device.

4. The power over Ethernet apparatus of claim 1, wherein the branch exchanging chip comprises:
   a first input terminal coupled with the main chip;
   a second input terminal coupled with the redundant controller;
   an output terminal coupled with the PSE controller; and
   a control terminal coupled with the redundant controller.

5. The power over Ethernet apparatus of claim 1, wherein the branch exchanging chip comprises an Inter-Integrated Circuit exchanging chip.

6. The power over Ethernet apparatus of claim 1, wherein the connection between the redundant controller and the main chip is a bidirectional communication.

7. A method of power over Ethernet suited for the power over Ethernet apparatus of claim 1, comprising:
   controlling, via the main chip, the PSE controller through the first branch, and sending the heart-beat signal to the redundant controller;
   controlling, via the redundant controller, the PSE controller through the second branch when the main chip stops sending the heart-beat signal, wherein the main chip stopping sending the heart-beat signal indicates that the main chip no longer controls the PSE controller; and
   switching, via the branch exchanging chip, between the first branch and the second branch according to a control signal from the redundant controller.

8. The method of power over Ethernet of claim 7, comprising:
   switching off, via the redundant controller, the second branch when the main chip resumes sending the heart-beat signal; and
   controlling, via the main chip, the PSE controller through the first branch when the second branch is off.

9. A method of power over Ethernet suited for the power over Ethernet apparatus of claim 1, comprising:
   sending, via the redundant controller, a first control signal to the branch exchanging chip when the main chip stops sending the heart-beat signal, wherein the main chip stopping sending the heart-beat signal indicates that the main chip no longer controls the PSE controller;
   switching on, via the branch exchanging chip, the second branch in response to the first control signal; and
   controlling, via the redundant controller, the PSE controller through the second branch when the second branch is on.

10. The method of power over Ethernet of claim 9, comprising:
   sending, via the redundant controller, a second control signal to the branch exchanging chip when the main chip resumes sending the heart-beat signal;
   switching on the first branch and switching off the second branch, via the branch exchanging chip, in response to the second control signal; and
   controlling, via the main chip, the PSE controller through the first branch when the first branch is on.

* * * * *